United States Patent
Mears et al.

(10) Patent No.: US 7,070,242 B2
(45) Date of Patent: Jul. 4, 2006

(54) ARMOR SYSTEM WITH MONOLITHIC CERAMIC SHELL

(75) Inventors: Jeffrey A. Mears, Chandler, AZ (US); Marvin K. Richards, Gilbert, AZ (US); Luis A. Bohorquez, Tempe, AZ (US)

(73) Assignee: Simula, Inc., Phoenix, AZ (US)

( * ) Notice: Subject to any disclaimer, the term of this patent is extended or adjusted under 35 U.S.C. 154(b) by 374 days.

(21) Appl. No.: 10/656,332

(22) Filed: Sep. 8, 2003

(65) Prior Publication Data
US 2004/0066082 A1    Apr. 8, 2004

Related U.S. Application Data

(60) Provisional application No. 60/415,143, filed on Oct. 2, 2002.

(51) Int. Cl.
*B60N 2/42* (2006.01)

(52) U.S. Cl. ............... 297/452.12; 297/216.1

(58) Field of Classification Search ............ 297/216.1, 297/452.11, 452.12; 244/122 R
See application file for complete search history.

(56) References Cited

U.S. PATENT DOCUMENTS

| | | | | |
|---|---|---|---|---|
| 3,509,833 A | * | 5/1970 | Cook | ........................... 109/82 |
| 3,581,620 A | * | 6/1971 | Hauck et al. | ........... 297/452.12 |
| 3,922,034 A | * | 11/1975 | Eggert | .................... 297/216.12 |
| 5,164,536 A | * | 11/1992 | Barbaza et al. | ......... 244/122 R |
| 5,306,557 A | | 4/1994 | Madison | |
| 5,705,764 A | | 1/1998 | Schnade et al. | |
| 5,887,453 A | | 3/1999 | Woods | |
| 5,918,309 A | | 7/1999 | Bachner, Jr. | |
| 5,947,515 A | * | 9/1999 | Fitch | ........................ 297/216.1 |
| 6,009,789 A | | 1/2000 | Lyons | |
| 6,073,884 A | * | 6/2000 | Lavergne | ................. 244/122 R |
| 6,253,655 B1 | | 7/2001 | Lyons et al. | |
| 6,389,594 B1 | | 5/2002 | Yavin | |
| 6,550,858 B1 | * | 4/2003 | Grohs et al. | ............. 297/216.1 |

* cited by examiner

*Primary Examiner*—Peter R. Brown
(74) *Attorney, Agent, or Firm*—Pillsbury Winthrop Shaw Pittman LLP

(57) ABSTRACT

A ceramic shell is disclosed. The ceramic shell can be used, for example, in an armor device or system. The ceramic shell includes two or more of an upper portion, a curved portion, and a seat portion. At least one of the upper portion, the curved portion, and the seat portion includes at least one of a first side portion and a second side portion. The at least of one the first side portion and the second side portion extends forward and includes at least one curved surface. The at least one of the first side portion and the second side portion is monolithically connected to at least one of the upper portion, the curved portion, and the seat portion.

30 Claims, 6 Drawing Sheets

KNOWN ART

KNOWN ART

KNOWN ART

ARMOR SYSTEM WITH MONOLITHIC CERAMIC SHELL

This application claims the benefit of U.S. Provisional Application No. 60/415,143, filed Oct. 2, 2002, which is incorporated herein by reference in its entirety.

BACKGROUND

1. Field of the Invention

The present invention relates generally to armor systems, and more particularly, to an armor system with a monolithic ceramic shell.

2. Background of the Invention

Traditional lightweight ballistic armor systems utilize flat ceramic tiles bonded to a composite backing laminate. For some applications, such as armored helicopter aircrew seats, ballistic protection is provided for large areas on the back, bottom and sides of the seat "bucket."

As shown in FIGS. 1, 2, and 3, this is typically achieved, using current manufacturing technology, by bonding precision fitted flat ceramic plates 110, in a "mosaic" pattern, to the exterior of composite bucket 100. This approach results in high manufacturing costs, both for fabrication of the tiles and for their installation, and in less than optimized weight for a given level of protection. Furthermore, additional measures must be taken to alleviate the loss of protective capability of each tile close to its edges, at the tile-to-tile edge joints.

The following problems and limitations are associated with the traditional approach.

Despite the fact that the composite buckets for a given seat model are fabricated using a common set of tooling, minor dimensional variations occurs from seat to seat. This requires the ceramic armor tiles to be individually fitted, by grinding, for each location on each seat; clearly a time consuming and expensive manufacturing step.

Ceramic tiles exhibit a significant loss in ballistic protective capability in the areas close to their edges, compared with the centers of the tiles. Consequently, the many seams in a mosaic of tiles presents substandard protection, unless they are capped by strips of such materials as glass or ceramic. This technique is disclosed in U.S. Pat. No. 6,009,789, assigned to the same assignee as the present application, the entirety of which is incorporated by reference herein. The tiles can also be thickened in the areas adjacent to the seams (i.e., the tiles are produced with raised edges). However, this adds to the weight and cost of the armor system.

The flat tile mosaic approach limits the design of the seat bucket to a prismatic shape that presents a set of essentially flat surfaces on which the tiles can be mounted. The prismatic shape requires a larger surface area to enclose a given volume, thus requiring a larger area of the relatively heavy ceramic for a given amount of ballistic protection for the seat occupant.

BRIEF SUMMARY OF THE INVENTION

One aspect of the invention provides a ceramic shell. The ceramic shell can be used, for example, in an armor device or system. The ceramic shell includes an upper portion, a curved portion, and a seat portion. The upper portion has a first side portion and a second side portion. The first side portion of the upper portion extends forward and includes at least one curved surface. The second side portion of the upper portion also extends forward and includes at least one curved surface. The first side portion of the upper portion, the upper portion, and the second side portion of the upper portion are formed of a monolithic piece of ceramic material. The curved portion is connected to the upper portion at an upper end of the curved portion. The seat portion is connected to the curved portion at a lower end of the curved portion. Preferably, the ceramic shell further includes a forward interior surface. The forward interior surface is configured to mate with a rearward surface of a composite bucket.

Preferably, the curved portion also includes a first side portion and a second side portion. The first side portion of the curved portion extends forward and includes at least one curved surface. The second side portion of the curved portion also extends forward and including at least one, curved surface. The first side portion of the curved portion, the curved portion, and the second side portion of the curved portion are formed of a monolithic piece of ceramic material. Preferably, the upper portion and the curved portion are formed of a monolithic piece of ceramic material. Preferably, the upper portion and the curved portion share at least one continuous surface.

Preferably, the seat portion also includes a first side portion and a second side portion. The first side portion of the seat portion extends forward and includes at least one curved surface. The second side portion of the seat portion also extends forward and includes at least one curved surface. The first side portion of the seat portion, the seat portion, and the second side portion of the seat portion are formed of a monolithic piece of ceramic material. Preferably, the upper portion and the seat portion are formed of a monolithic piece of ceramic material. Preferably, the upper portion and the seat portion share at least one continuous surface.

In one embodiment, the seat portion and the curved portion are formed of a monolithic piece of ceramic material. In another embodiment, the seat portion, the curved portion, and the upper portion are all formed of a monolithic piece of ceramic material. In another embodiment, the seat portion and the curved portion share at least one continuous surface.

Preferably, the ceramic shell includes at least one cut-out. Preferably, the cut-out is pre-formed in the ceramic shell. Preferably, at least one portion of the ceramic shell includes at least one groove. Preferably, the grove defines at least one enclosed area.

Another aspect of the invention provides an armor device that includes a composite bucket and a ceramic shell. The composite bucket includes a rearward surface. The ceramic shell includes a forward interior surface. The forward interior surface of the ceramic shell is configured to mate with the rearward surface of the composite bucket. The ceramic shell includes two or more of an upper portion, a curved portion, and a seat portion. The two or more of the upper portion, the curved portion, and the seat portion of the ceramic shell are formed of a monolithic piece of ceramic material. Each of the upper portion, the curved portion, and the seat portion includes at least one of a first side portion and a second side portion. The at least one of the first side portion and the second side portion extends forward and includes at least one curved surface.

Preferably, the composite bucket is constructed as layers of material laid upon the forward interior surface of the ceramic shell.

In one embodiment, the upper portion and the curved portion are joined together. Preferably, the upper portion and the curved portion share at least one substantially continuous surface.

In another embodiment, the seat portion and the curved portion are joined together. Preferably, the seat portion and the curved portion share at least one substantially continuous surface.

In another embodiment, the seat portion and the upper portion are joined together. Preferably, the seat portion and the upper portion share at least one substantially continuous surface.

In another aspect, the invention provides a monolithic ceramic shell that includes an upper portion, a curved portion, and a seat portion. The upper portion has a lower end. The curved portion is monolithically connected to the lower end of the upper portion. The curved portion having a lower end. The seat portion is monolithically connected to the lower end of the curved portion. The upper portion, the curved portion, and the seat portion are all formed of a monolithic piece of ceramic material.

Preferably, the upper portion includes at least one side portion. The at least one side portion of the upper portion extends forward and includes at least one curved surface. The at least one side portion of the upper portion and the upper portion are formed of a monolithic piece of ceramic material.

Preferably, the curved portion includes at least one side portion. The at least one side portion of the curved portion extends forward and includes at least one curved surface. The at least one side portion of the curved portion and the curved portion are formed of a monolithic piece of ceramic material.

Preferably, the seat portion includes at least one side portion. The at least one side portion of the seat portion extends forward and includes at least one curved surface. The at least one side portion of the seat portion and the seat portion are formed of a monolithic piece of ceramic material.

Another aspect of the invention provides an armor system that includes a ceramic shell and a composite bucket. The ceramic shell includes an upper portion, a seat portion, and a forward interior surface. The composite bucket is disposed adjacent to a substantial portion of the forward interior surface of the ceramic shell.

Preferably, the composite bucket includes a rearward surface and the rearward surface of the composite bucket mates with the forward interior surface of the ceramic shell. Preferably, the composite bucket is constructed as layers of material laid upon the forward interior surface of the ceramic shell. Preferably, at least one portion of the ceramic shell includes at least one groove. Preferably, the at least one grove defines at least one enclosed area. Preferably, the ceramic shell includes at least one cut-out. Preferably, the at least one cut-out is pre-formed in the ceramic shell. Preferably, the composite bucket is configured to receive at least one mechanical connector at the at least one cut-out. Preferably, the ceramic shell further includes a curved portion located between the upper portion and the seat portion.

DETAILED DESCRIPTION OF THE INVENTION

Figure 1:
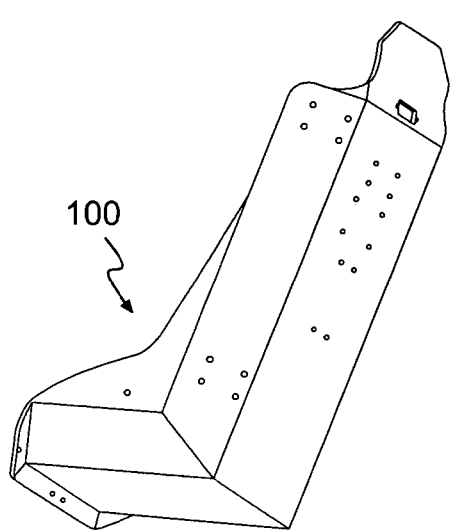
FIG. 1 shows a known "prismatic" composite seat bucket.
Figure 2:
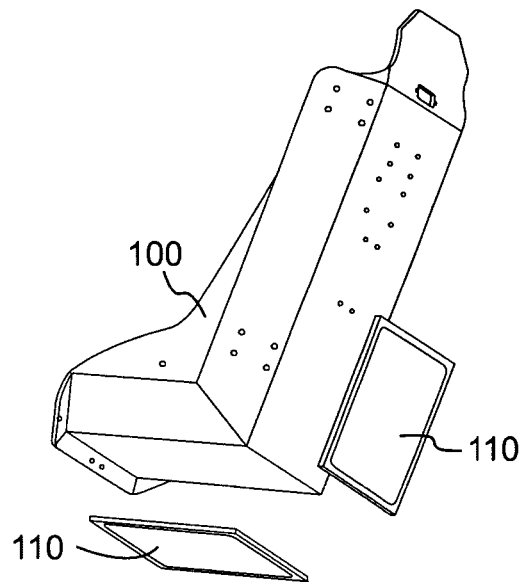
FIG. 2 shows flat ceramic tiles before they are associated with the composite seat bucket of FIG. 1.
Figure 3:
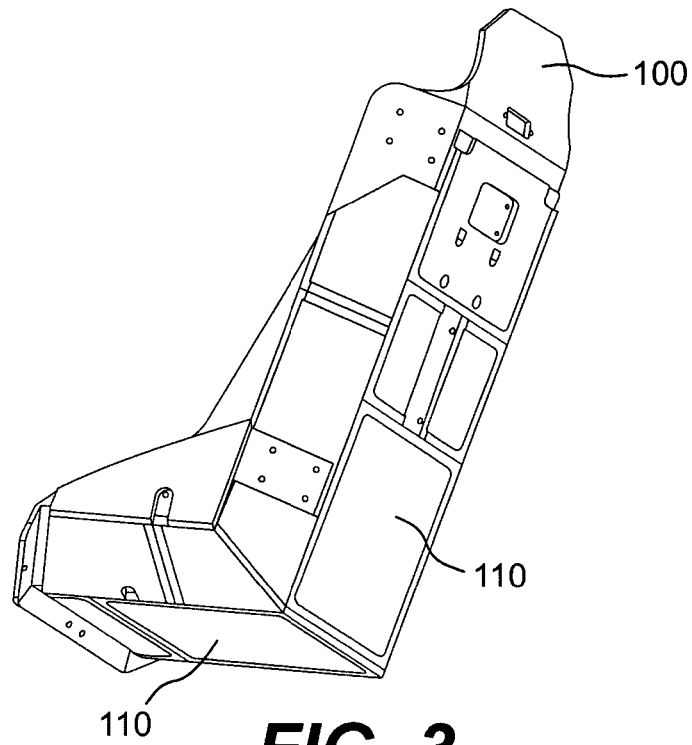
FIG. 3 shows the flat ceramic tiles of FIG. 2 installed on the composite seat bucket of FIG. 1.

One aspect of this invention is intended to overcome all of the disadvantages associated with traditional mosaic of ceramic tiles by replacing them with a larger ceramic shell.

This invention, which is primarily, although not exclusively, directed towards military aircraft crew seats, seeks to replace numerous precision-fitted flat ceramic tiles with a larger piece of ceramic shell that effectively covers the same protective area in a lightweight ballistic armor system. The process of co-curing the composite backing on the ceramic shell is also a departure from the procedure currently used to manufacture armored aircrew seats.

Manufacturing of ceramic-composite body armor "inserts" is relatively straightforward and the process has been refined to become cost-effective. This has been possible because the ceramic "tiles" employed are relatively small (approximately 8×10 inches) and are either flat or have only minor surface curvature. This permits lay-up of the composite directly on the tile with subsequent autoclave curing at elevated pressure and temperature, which cures the composite (without degrading the ceramic) and bonds it to the tile (this is referred to as "co-curing").

On the other hand, in the case of installing ceramic armor on military aircraft crew seats, the process has been much more involved. This is because, typically, the size and "3-dimensional" shape of the pre-cured composite seat bucket has required that the ceramic be bonded to the bucket exterior as a mosaic of precision ground and fitted tiles of various shapes and sizes.

This approach required the bucket shape to be prismatic, so that it provided flat surfaces for mounting the tiles, which were cut from flat panels. The current state of the art for producing ceramic materials suitable for armor applications involves either of two basic processes, hot-pressing or sintering.

To achieve suitable interface dimensional tolerances with these processes, for successful integration of the tiles with the composite backing, it has generally been necessary to use flat tile. The obvious disadvantage of this approach is the considerable manufacturing cost, not only in fabricating the many tiles involved but also in their installation on the bucket. Less obvious disadvantages include the need to add protective strips over all the tile edge-to-edge joints, or to increase the tile thickness at all edges, to compensate for the substandard ballistic protection afforded by the tile when hit close to an edge, and the fact that a faceted bucket shell has more surface area than an equivalent curvilinear one and would therefore require a heavier weight of ceramic armor to provide the same protection.

The current invention addresses all of the issues pertaining to the application of ceramic armor on military aircraft crew seats. Since the complete ceramic armor for the seat is produced as a monolithic shell that can be made to have any open surface curvature that might be required on a seat bucket, it totally eliminates the need for expensive fabrication and installation of "mosaic" tiles. Furthermore, it provides a ready-made mold for laying up the composite bucket, which can then be cured in an autoclave, simultaneously bonding the composite to the ceramic, as in the case of the body armor inserts. Because the monolithic shell can have curved surfaces the amount of ceramic required for a given threat application can be minimized, hence so can the overall weight of the armored assembly.

The invention includes a ceramic shell and a suitably designed composite laminate backing, also referred to as a composite bucket. The ceramic shell is designed and fabricated such that, when bonded to the backing, it provides the complete required area of lightweight ballistic armor protection for a given application. When the application is a military aircraft crewseat, the "backing" is the seat's composite bucket.

Figure 4:
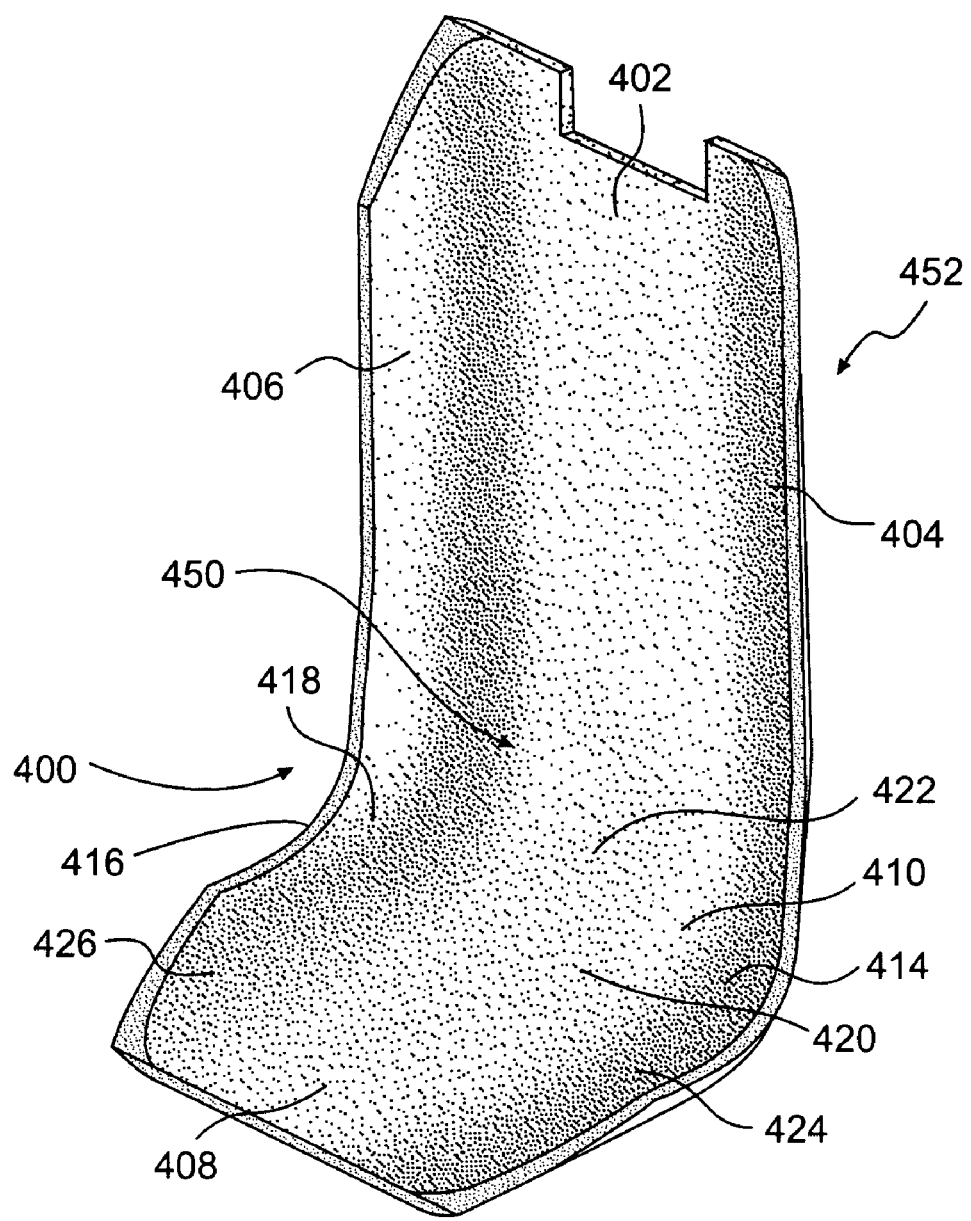
FIG. 4 shows a perspective view of an exemplary ceramic shell of the invention.

FIG. 4 shows an exemplary ceramic shell of the invention. Ceramic shell 400 includes forward interior surface 422, forward interior space 450, and rearward exterior space 452. Conceptually, forward interior space 450 eventually accommodates an occupant of a seat with which ceramic shell 400 is configured to associate.

Ceramic shell 400 includes upper portion 402, curved portion 410 and seat portion 408. Upper portion 402 is connected to curved portion 410 at upper end 418 of curved portion 410. Likewise, seat portion 408 is connected to curved portion 410 at lower end 420 of curved portion 410.

Upper portion 402 includes first side portion 404 and second side portion 406. First side portion 404 of upper portion 402 extends forward, in the general direction of forward interior space 450 and includes at least one curved surface. Second side portion 406 of upper portion 402 also extends forward and includes at least one curved surface.

In one embodiment, first side portion 404 of upper portion 402, upper portion 402, and second side portion 406 of upper portion 402 are formed of a monolithic piece of ceramic material.

Curved portion 410 includes first side portion 414 and second side portion 416. Preferably, first side portion 414 of curved portion 410 extends forward and includes at least one curved surface. Second side portion 416 of curved portion 410 also extends forward and includes at least one curved surface.

In one embodiment, first side portion 414 of curved portion 410, curved portion 410, and second side portion 416 of curved portion 410 are formed of a monolithic piece of ceramic material.

In some embodiments, upper portion 402 and curved portion 410 are formed of a monolithic piece of ceramic material.

In some embodiments, upper portion 402 and curved portion 410 share at least one continuous surface.

Turning to seat portion 408, first side portion 424 of seat portion 408 extends forward and includes at least one curved surface. Second side portion 426 of seat portion 408 also extends forward and includes at least one curved surface.

In some embodiments, first side portion 424 of seat portion 408, seat portion 408, and second side portion 426 of seat portion 408 are formed of a monolithic piece of ceramic material.

In some embodiments in which there is no curved portion 410, upper portion 402 and seat portion 408 are formed of a monolithic piece of ceramic material.

In some embodiments, seat portion 408 and curved portion 410 are formed of a monolithic piece of ceramic material.

In some embodiments, seat portion 408, curved portion 410, and upper portion 402 are all formed of a monolithic piece of ceramic material.

In some embodiments, seat portion 408 and curved portion 410 share at least one continuous surface.

In some applications where producing the required area of armor coverage with a single-piece ceramic shell is impracticable, such as those involving very large structures or exceptionally complex surface shapes, the monolithic approach may be adapted such that a strategically minimal number of smaller shells may be employed.

Figure 5:
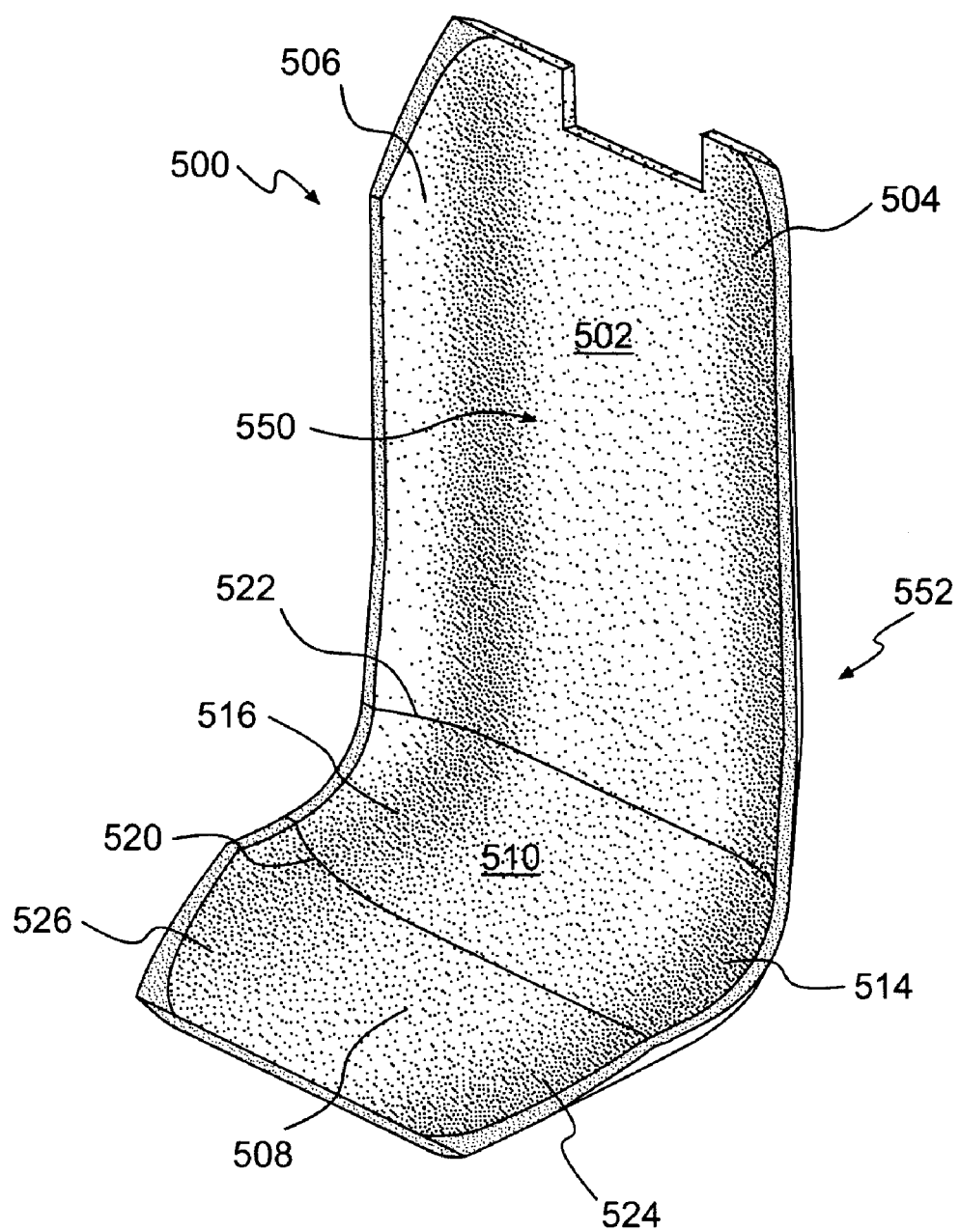
FIG. 5 shows a perspective view of another exemplary ceramic shell of the invention.

FIG. 5 is an isometric diagram showing another preferred embodiment of the invention. This embodiment employs a number of smaller shells or members instead of one monolithic shell.

Ceramic shell 500 includes forward interior space 550 and rearward exterior space 552. Ceramic shell 500 includes three separate members: upper member 502, curved member 510, and seat member 508. Although this embodiment uses three members, more or less members can be used. Upper member 502 is connected to curved member 510 at upper end 522 of curved member 510. Likewise, seat member 508 is connected to curved member 510 at lower end 520 of curved member 510.

Upper member 502 includes first side portion 504 and second side portion 506. First side portion 504 of upper member 502 extends forward, in the general direction of forward interior space 550 and includes at least one curved surface. Second side portion 506 of upper member 502 also extends forward and includes at least one curved surface.

In one embodiment, first side portion 504 of upper member 502, upper member 502, and second side portion 506 of upper member 502 are formed of a monolithic piece of ceramic material.

Curved member 510 includes first side portion 514 and second side portion 516. Preferably, first side portion 514 of curved member 510 extends forward and includes at least one curved surface. Second side portion 516 of curved member 510 also extends forward and includes at least one curved surface.

In one embodiment, first side portion 514 of curved member 510, curved member 510, and second side portion 516 of curved member 510 are formed of a monolithic piece of ceramic material.

In some embodiments, seat member 508 includes first side portion 524 and second side portion 526. First side portion 524 of seat member 508 extends forward, in the general direction of forward interior space 550 and includes at least one curved surface. Second side portion 526 of seat member 508 also extends forward and includes at least one curved surface.

In one embodiment, first side portion 524 of seat member 508, seat member 508, and second side portion 526 of seat member 508 are formed of a monolithic piece of ceramic material.

In such case where the ceramic shell is constructed using more than one monolithic piece, the ceramic shells would preferably include provisions that permit the easy assembly and alignment of the different shell members. Some embodiments feature pre-formed stepped edges designed for overlapping or lap joints between shells, as shown in FIG. 6.

Figure 6:
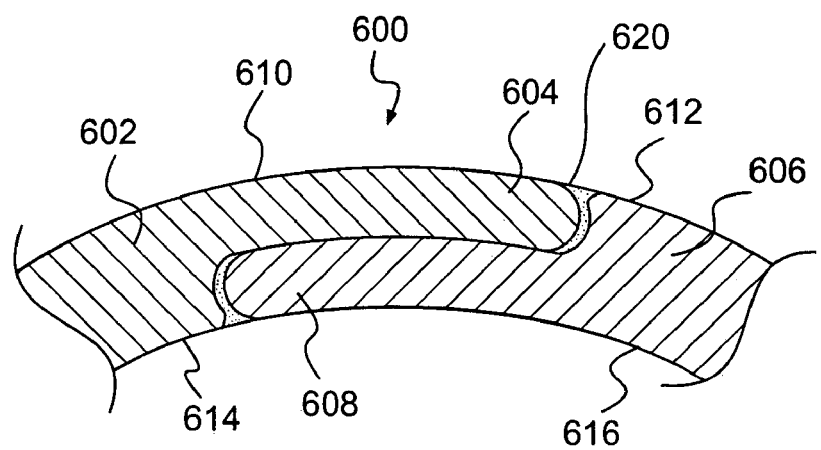
FIG. 6 shows a preferred embodiment of a joint between two ceramic members.

FIG. 6 shows a preferred embodiment of a joint between two ceramic members. Joint 600 can be used anywhere two ceramic members come together. For example, joint 600 can be used to join upper member 502 to curved member 510, and curved member 510 to seat member 508. Joint 600 is preferably a type of lap joint where first ceramic member 602 includes upper extension 604 and second ceramic member 606 includes lower extension 608. Extensions 604 and 608 are formed in such a way that upper surface 610 of first ceramic member 602 is substantially continuous with upper surface 612 of second ceramic member 606. Similarly, lower surface 614 of first ceramic member 602 is substantially continuous with the lower surface 616 of second ceramic member 606.

Preferably, fillets are provided on all confronting surfaces and edges. In an exemplary embodiment, the fillets include relatively large radii, as shown in FIG. 6, to preclude regions of high stress concentration on the ceramic members. The overlap provides satisfactory ballistic protection at the joints and helps to ensure correct assembly of the ceramic components. Adhesive agent 620 can be used between the first and second ceramic members 602 and 606 to complete assembly. Adhesive agent 620 can be, for example, glue or other adhesive material.

The ceramic shells of the invention can be manufactured using a "reaction-bonded" process that eliminates the need for high temperatures (such as experienced in hot-pressing and sintering) and high pressures (as in hot-pressing) typically associated with the manufacture of armor ceramics. The differences in the manufacturing approaches taken would relate primarily to the design and fabrication of the molds needed to form the substantially larger and highly curved monolithic shells and to the method of supporting the shells during their infiltration cycle. It is noted that the ceramic shells of the invention can be used with hot pressed or sintered products as well. Alternatively, the ceramic shells of the invention can be manufactured using other processes.

Figure 7:
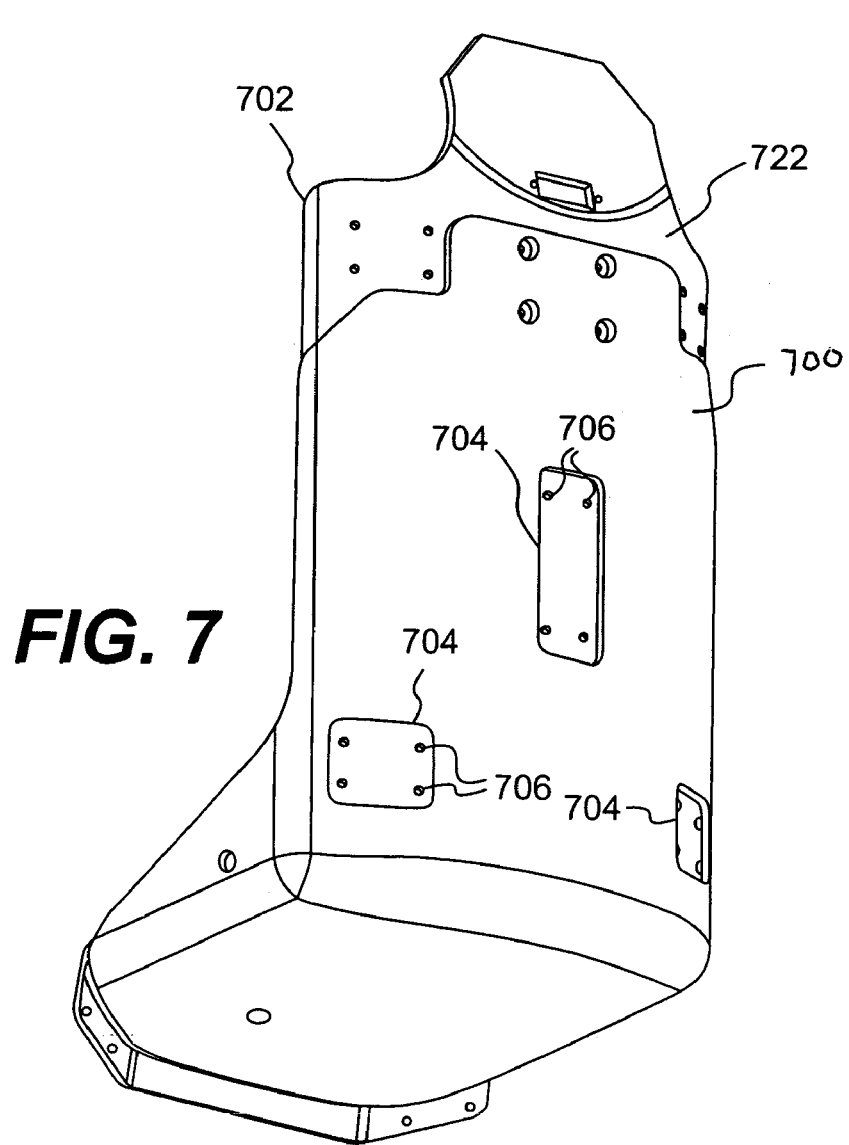
FIG. 7 is a perspective view of another exemplary embodiment of the invention, showing a ceramic shell associated with a composite bucket of a seat.
Figure 10:
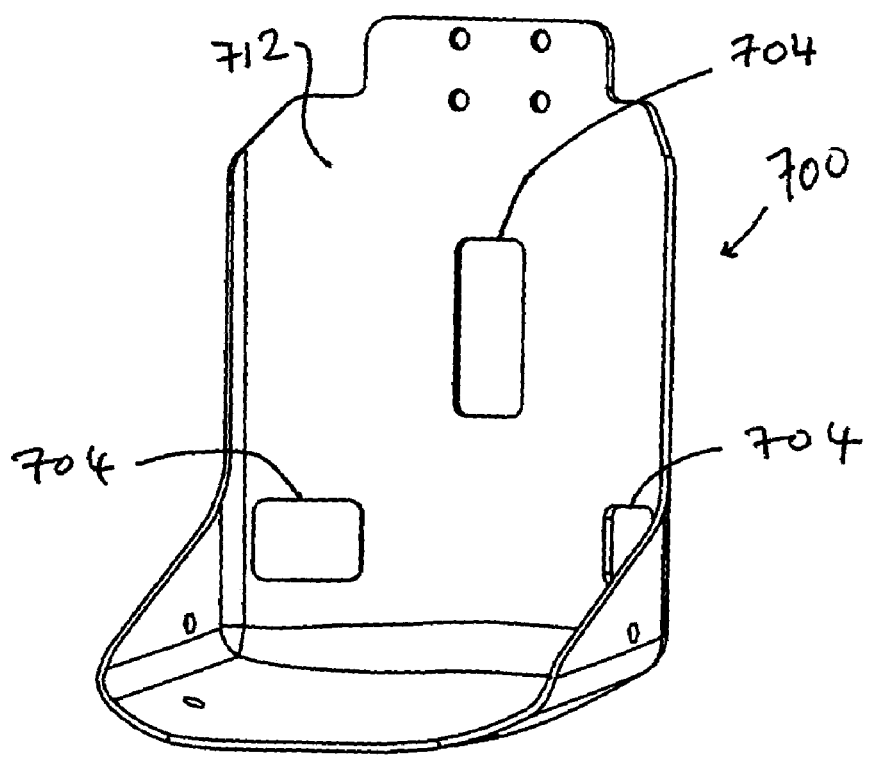
FIG. 10 shows an exemplary ceramic shell of the invention with cut-outs.

Referring to FIG. 7, after a particular ceramic shell, either totally monolithic (e.g., ceramic shell 400) or segmented (e.g., ceramic shell 500), has been selected, a composite bucket 702, as shown in FIG. 7, is preferably associated with the ceramic shell. For example, ceramic shell 700 with cut-outs 704 shown in FIG. 10 may be selected to associate with composite bucket 702. There are many different ways and methods that can be employed to associate composite bucket 702 with ceramic shell 700.

Preferably, composite bucket 702 includes rearward surface 722. Rearward surface 722 of composite bucket 702 is configured to mate with forward interior surface 712 (see FIG. 10) of monolithic ceramic shell 700, as shown in FIG. 7.

Composite bucket 702 can be co-cured on, and simultaneously bonded to ceramic shell 700 by using a composite fabric that has been pre-impregnated with the correct amount of resin binder. This co-curing operation eliminates several time-consuming processes or steps that would otherwise be required for post-cure bonding of the ceramic shell to the composite backing. Alternatively, the present invention can be configured to bond ceramic shell 700 to previously cured composite bucket 702. Composite bucket 702 can be a metallic backing.

In the applications involving the manufacture of an armored seat bucket, the ceramic component would be temporarily integrated with a secondary mold to provide a complete surface on which the resin impregnated composite layers would be "laid-up" to form composite bucket 702 (which generally extend, in all directions, beyond the perimeter of ceramic shell 700). After the lay-up has been completed, the composite, together with its supporting ceramic shell 700, would be placed in an autoclave, for curing at elevated temperature and pressure. As well as being cured, the composite would be securely bonded to the ceramic shell, which would not be degraded by the process. The composite is fabricated at a few hundred degrees centigrade whereas the ceramic is cured at temperatures in the range of 1,500 to 2,200 degrees centigrade. In other embodiments, different composite systems have different cure cycles based on the resin matrix used in the composite matrix.

Preferably, ceramic shell 700 includes at least one cut-out 704. Cut-outs 704 are preferably pre-formed in ceramic shell 700 and are used in conjunction with suitable mechanical connectors 706 to attach items directly to composite bucket 702.

Some embodiments include provisions that are used to avoid extended propagation of cracks initiated in the surface of the ceramic material. Typically, when a ceramic member is struck sufficiently hard to cause fracture, the resultant cracks generally only propagate as far as the edges of the ceramic member. Similarly, cracks also tend to propagate to the edges in larger, monolithic shells. In this case, there is a possibility that a crack can propagate across an entire ceramic member.

Figure 8:
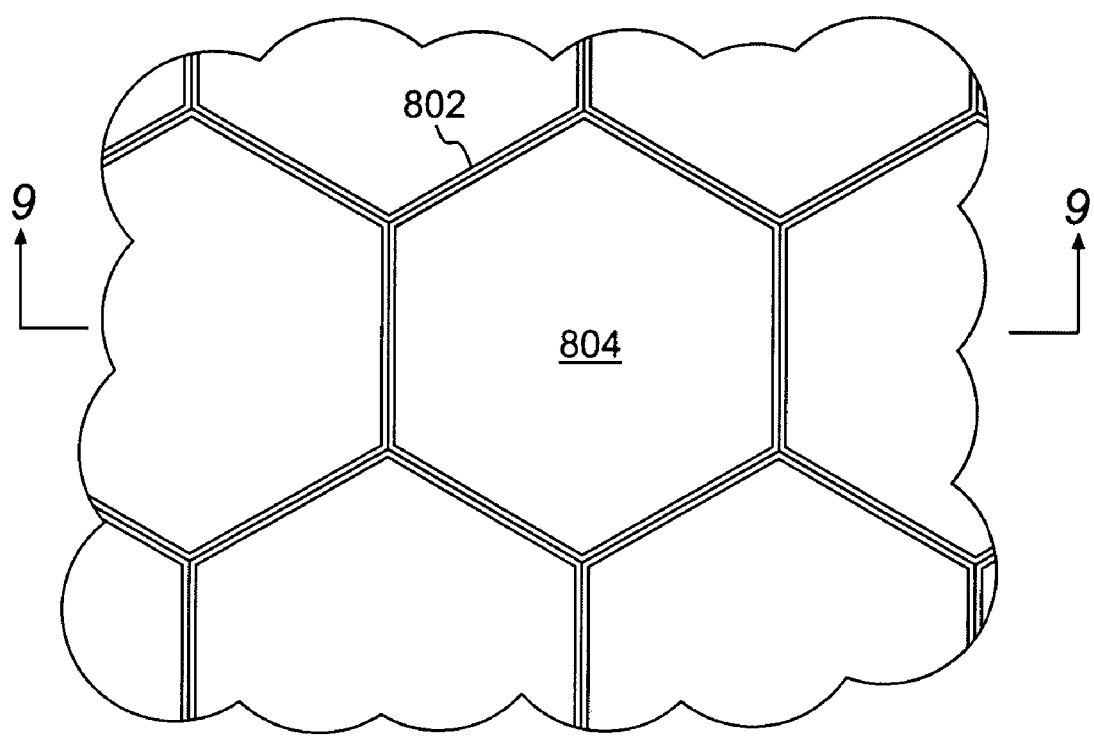
FIG. 8 shows one approach to provide a ceramic shell of the invention with at least one groove.
Figure 9:
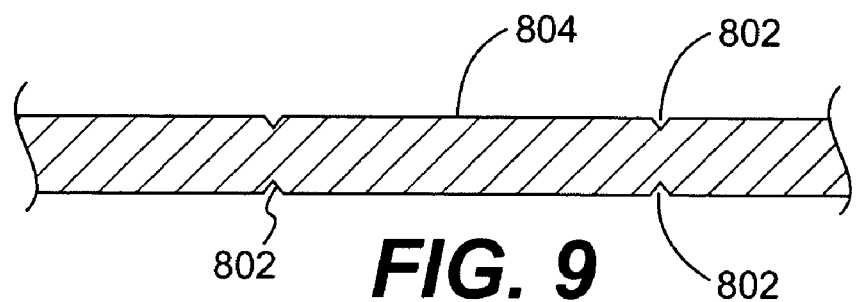
FIG. 9 is a cross-sectional view along line 9—9 shown in FIG. 8.

Referring to FIG. 8, one approach to counteract this situation is to provide the shell with at least one groove 802. In some embodiments, the a network of shallow grooves, on one or both surfaces (see FIG. 9), defining closed cells or enclosed areas 804 can be used. The propagation of cracks initiated within any of these enclosed areas 804 would be confined within the boundary grooves defining the cell. This arrangement helps to limit crack propagation.

Preferred Materials

Ceramics: The preferred ceramics for the subject armor applications include Aluminum Oxide (least expensive but heaviest) and Boron Carbide (most expensive but lightest) with Silicon Carbide as a good compromise between the two extremes. Recently, reaction-bonded ceramic composites of Boron Carbide and Silicone Carbide have found favor because they perform ballistically almost as well as the top performer, Boron Carbide, with manufacturing costs almost as low as Aluminum Oxide.

Composite; Fabric: The preferred fabrics are woven from high strength fibers including aramid (KEVLAR) and a UHMW Polyethylene fiber, produced by Honeywell Inc., known as "SPECTRA".

Composite; Resin: The preferred resins for bonding the fabric layers together and stiffening the composite include are vinylester, polyester and epoxy resin adhesives.

Other Applications

In addition to its application to armored air crew seats on aircraft and helicopters, the monolithic ceramic shell approach of the invention could can also be used in lightweight applique armor systems for such military land vehicles as the High-Mobility Multi-Wheeled Vehicle (HMMWV) and the Armored Security Vehicle (ASV). It also lends itself well to applications involving the installation of lightweight armor on civilian vehicles such as those used to transport Heads of State and other high-profile VIP's. Commercial applications may involve such components as a complete armored door panel, that is ready for installation in lieu of the conventional door.

The foregoing disclosure of the preferred embodiments of the present invention has been presented for purposes of illustration and description. It is not intended to be exhaustive or to limit the invention to the precise forms disclosed.

Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A ceramic seat shell for protecting an occupant, comprising:
   a curved portion that transitions a substantially vertical orientation of a backrest portion of the ceramic seat shell into a substantially horizontal orientation of a seat portion of the ceramic seat shell, wherein the curved portion having at least one side portion, the side portion extending forward and including at least one curved surface, wherein the side portion and the curved portion are formed of a monolithic piece of ceramic material.

2. The ceramic seat shell of claim 1, further comprising at least one of:
   a backrest portion having the substantially vertical orientation, wherein the backrest portion and the curved portion are joined together; and
   a seat portion having the substantially horizontal orientation, wherein the seat portion and the curved portion are joined together.

3. The ceramic seat shell of claim 2, wherein the curved portion and the backrest portion are formed of a monolithic piece of ceramic material.

4. The ceramic seat shell of claim 2, wherein the curved portion and the seat portion are formed of a monolithic piece of ceramic material.

5. The ceramic seat shell of claim 2, wherein the curved portion, the backrest portion, and the seat portion are formed of a monolithic piece of ceramic material.

6. The ceramic seat shell of claim 2, wherein at least one of the backrest portion and the seat portion comprises a side portion extending forward and including at least one curved surface, wherein the side portion and the at least one of the backrest portion and the seat portion are formed of a monolithic piece of ceramic material.

7. The ceramic seat shell of claim 2, wherein the backrest portion and the curved portion share at least one continuous surface.

8. The ceramic seat shell of claim 2, wherein the seat portion and the curved portion share at least one continuous surface.

9. The ceramic seat shell of claim 1, further comprising a forward interior surface, wherein the forward interior surface is configured to mate with a rearward surface of a composite bucket.

10. The ceramic seat shell of claim 2, further comprising at least one cut-out.

11. The ceramic seat shell of claim 10, wherein the cut-out is pre-formed in the ceramic seat shell.

12. The ceramic seat shell of claim 1, wherein at least one portion of the ceramic seat shell includes at least one groove.

13. The ceramic seat shell of claim 12, wherein the at least one grove defines at least one enclosed area.

14. A ceramic seat shell for protecting an occupant, comprising:
   a backrest portion having a substantially vertical orientation;
   a seat portion having a substantially horizontal orientation; and
   a curved portion located in between the backrest portion and the seat portion, wherein the curved portion transitions the substantially vertical orientation to the substantially horizontal orientation, wherein the curved portion having at least one side portion, the side portion extending forward and including at least one curved surface, wherein the side portion and the curved portion are formed of a monolithic piece of ceramic material,
   wherein at least two of the backrest portion, the curved portion, and the seat portion are formed of a monolithic piece of ceramic material.

15. The ceramic seat shell of claim 14, wherein at least one of the backrest portion, the curved portion, and the seat portion includes at least one side portion, the at least one side portion including at least one curved surface, wherein the at least one side portion and the at least one of the backrest portion, the curved portion, and the seat portion are formed of a monolithic piece of ceramic material.

16. A ceramic seat shell for protecting an occupant, comprising:
   a backrest portion having a substantially vertical orientation;
   a seat portion having a substantially horizontal orientation; and
   a curved portion located in between the backrest portion and the seat portion, wherein the curved portion transitions the substantially vertical orientation to the substantially horizontal orientation,
   wherein each of the backrest portion, the curved portion, and the seat portion includes at least one side portion that extends forward, the at least one side portion including at least one curved surface, wherein the at least one side portion, the backrest portion, the curved portion, and the seat portion are formed of a monolithic piece of ceramic material.

17. An armor device for protecting an occupant in a bucket seat, comprising:
   a composite bucket having a rearward surface; and
   a ceramic seat shell having a forward interior surface, the forward interior surface is configured to mate with the rearward surface of the composite bucket, the ceramic seat shell comprising a curved portion that transitions a substantially vertical orientation of a backrest portion of the ceramic seat shell into a substantially horizontal orientation of a seat portion of the ceramic seat shell, wherein the curved portion having at least one side portion, the side portion extending forward and including at least one curved surface, wherein the side portion and the curved portion are formed of a monolithic piece of ceramic material.

18. The armor device of claim 17, wherein the ceramic seat shell further comprising at least one of:
   a backrest portion having the substantially vertical orientation, wherein the backrest portion and the curved portion are joined together; and a seat portion having the substantially horizontal orientation, wherein the seat portion and the curved portion are joined together.

19. The armor device of claim 18, wherein the curved portion and the backrest portion are formed of a monolithic piece of ceramic material.

20. The armor device of claim 18, wherein the curved portion and the seat portion are formed of a monolithic piece of ceramic material.

21. The armor device of claim 18, wherein the curved portion, the backrest portion, and the seat portion are formed of a monolithic piece of ceramic material.

22. The armor device of claim 17, wherein the composite bucket is constructed as layers of material laid upon the forward interior surface of the ceramic seat shell.

23. An armor system for protecting an occupant in a bucket seat, comprising:
a composite bucket having a rearward surface; and
a ceramic seat shell having a forward interior surface, the forward interior surface is configured to mate with the rearward surface of the composite bucket, the ceramic seat shell comprising:
a backrest portion having a substantially vertical orientation;
a seat portion having a substantially horizontal orientation; and
a curved portion located in between the backrest portion and the seat portion, wherein the curved portion transitions the substantially vertical orientation to the substantially horizontal orientation, wherein the curved portion having at least one side portion, the side portion extending forward and including at least one curved surface, wherein the side portion and the curved portion are formed of a monolithic piece of ceramic material, wherein at least two of the backrest portion, the curved portion, and the seat portion are formed of a monolithic piece of ceramic material.

24. The system of claim 23, wherein at least one of the backrest portion, the curved portion, and the seat portion includes at least one side portion, the at least one side portion including at least one curved surface, wherein the at least one side portion and the at least one of the backrest portion, the curved portion, and the seat portion are formed of a monolithic piece of ceramic material.

25. The system of claim 23, wherein the composite bucket is constructed as layers of material laid upon the forward interior surface of the ceramic seat shell.

26. The system of claim 23, wherein at least one portion of the ceramic seat shell includes at least one groove.

27. The system of claim 26, wherein the at least one grove defines at least one enclosed area.

28. The system of claim 23, wherein the ceramic seat shell includes at least one cut-out.

29. The system of claim 28, wherein the at least one cut-out is pre-formed in the ceramic seat shell.

30. The system of claim 28, wherein the composite bucket is configured to receive at least one mechanical connector at the at least one cut-out.

* * * * *